(12) United States Patent
Gupta et al.

(10) Patent No.: US 9,086,285 B2
(45) Date of Patent: Jul. 21, 2015

(54) AUTOMATIC DETECTION OF PARKING LEVEL IN MULTI-LEVEL STRUCTURE

(71) Applicant: GENERAL MOTORS LLC, Detroit, MI (US)

(72) Inventors: Mukesh Gupta, Farmington, MI (US); Marco T. Carnevale, Windsor (CA); Sanjay Khunger, Brighton, MI (US); Santhosh Kumar Narayanan, Troy, MI (US); Joseph S. Niemiec, Southgate, MI (US)

(73) Assignee: General Motors LLC, Detroit, MI (US)

( * ) Notice: Subject to any disclaimer, the term of this patent is extended or adjusted under 35 U.S.C. 154(b) by 64 days.

(21) Appl. No.: 13/972,456

(22) Filed: Aug. 21, 2013

(65) Prior Publication Data

US 2015/0057926 A1    Feb. 26, 2015

(51) Int. Cl.
| | |
|---|---|
| *G01C 21/10* | (2006.01) |
| *G01C 21/16* | (2006.01) |
| *G08G 1/00* | (2006.01) |
| *G08G 1/14* | (2006.01) |
| *E04H 6/08* | (2006.01) |

(52) U.S. Cl.
CPC .............. *G01C 21/165* (2013.01); *G08G 1/205* (2013.01); *E04H 6/08* (2013.01); *G08G 1/14* (2013.01)

(58) Field of Classification Search
CPC .............. E04H 6/08; E04H 6/28; G08G 1/14; G08G 1/205; B60R 25/33; G07B 15/02
USPC ......... 701/500, 300, 529, 1, 517; 340/539.13, 340/988, 932.2
See application file for complete search history.

(56) References Cited

U.S. PATENT DOCUMENTS

| | | | | |
|---|---|---|---|---|
| 4,424,651 | A * | 1/1984 | Lee et al. .................. | 52/175 |
| 7,266,927 | B2 * | 9/2007 | Higgs ........................ | 52/175 |
| 2006/0228196 | A1 * | 10/2006 | Li ............................. | 414/227 |
| 2007/0294952 | A1 * | 12/2007 | Li ............................. | 52/30 |

* cited by examiner

*Primary Examiner* — Gertrude Arthur Jeanglaude
(74) *Attorney, Agent, or Firm* — Leydig, Voit & Mayer, Ltd.

(57) ABSTRACT

Implementations of the present invention contemplate utilizing the communicative connections between a telematics service provider (TSP), a communication device, and a telematics unit in a vehicle parked in a multilevel parking garage to determine location information of the vehicle and to provide such information to a subscriber of the TSP. A subscriber of a TSP may transmit a request for information pertaining to the location of a vehicle parked within a multilevel parking structure from a communication device. Upon the receipt of such a request, the TSP provides the information requested by the subscriber. In various implementations, the providing of such information by the TSP may involve querying the telematics unit in the vehicle or querying a database storing location information pertaining to one or more vehicles and may further involve performing calculations to derive the information requested by the communication device. In some implementations, the information requested by the communication device includes but is not limited to a floor number, or level, of the parking garage on which the telematics-equipped vehicle is parked.

18 Claims, 5 Drawing Sheets

AUTOMATIC DETECTION OF PARKING LEVEL IN MULTI-LEVEL STRUCTURE

TECHNOLOGY FIELD

The present disclosure relates generally to vehicular telematics systems and more specifically to the use of a telematics unit within a vehicle to determine a specific location of a vehicle within a multiple level parking garage.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring, global navigation system aided position identification, map services, and turn-by-turn navigation assistance. Telematics units are often provisioned and activated at a point of sale when a subscriber purchases a telematics-equipped vehicle. Once provisioned and activate, telematics units can be utilized by a subscriber to obtain telematics services, such as those described herein, from the TSP.

One service provided by a TSP is a Global Navigation Satellite System (GNSS) based navigation service. GNSS is a generic term referring to any of multiple satellite constellation-based global positioning networks including, for example, the Global Positioning System (GPS) constellation. Another GNSS constellation network is the Global Navigation Satellite System (GLONASS). A particular example of a GNSS based navigation service is the provision of turn-by-turn (TBT) directions from a current location of a vehicle or an alternative start location to a specified destination.

In addition to receiving telematics services at a telematics unit of a vehicle, subscribers may also connect to a TSP through mobile devices that are not physically connected to a vehicle. For example, a subscriber may be able to connect to a TSP and receive telematics services through a smart phone, a tablet computer, or another communication device. Such communication devices enable subscribers to receive telematics services while at a location remote from the telematics equipped vehicle. Services provided through such mobile communication services are often ancillary to the services provided directly to the vehicle, and may include billing and payment services and account management.

SUMMARY OF THE INVENTION

Implementations of the present invention contemplate utilizing the communicative connections between a telematics service provider (TSP), a communication device, and a telematics unit in a vehicle parked in a multilevel parking garage to determine location information of the vehicle and to provide such information to a subscriber of the TSP. A subscriber of a TSP may transmit a request for information pertaining to the location of a vehicle parked within a multilevel parking structure from a communication device. Upon the receipt of such a request, the TSP provides the information requested by the subscriber. In various implementations, the providing of such information by the TSP may involve querying the telematics unit in the vehicle or querying a database storing location information pertaining to one or more vehicles and may further involve performing calculations to derive the information requested by the communication device. In some implementations, the information requested by the communication device includes but is not limited to a floor number, or level, of the parking garage on which the telematics-equipped vehicle is parked.

One implementation consists of a method, implemented through the use of a telematics unit of a vehicle, for determining a present location of the vehicle within a multi-level parking structure, the method comprising determining that the vehicle is operating within a multi-level parking garage, determining a number of circles traversed by the vehicle on a spiraling vehicle ramp in the multi-level parking garage, determining, based at least partly upon the number of circles traversed, a first value identifying a level of the multi-level parking garage at which the vehicle is located.

An additional implementation consists of a method, implemented using a mobile device, for determining the location of a vehicle in a multi-level parking garage, the method comprising transmitting a request for information pertaining to the location of a vehicle from the mobile device to a telematics service provider, and receiving information identifying the level of the multi-level parking garage at which the vehicle is parked from the telematics service provider, wherein the level of the multi-level parking garage at which the vehicle is parked is determined based upon information provided by a telematics unit in the vehicle.

A further implementation consists of a system for determining the location of a vehicle within a multi-level parking structure, the system comprising a mobile device configured to transmit a request for a location of the vehicle within the multi-level parking structure and to receive data indicating the level of the parking garage at which the vehicle is parked, a telematics service provider having a server, the server configured to receive a request for a location of the vehicle within the multi-level parking structure, to submit a query for data pertaining to the level of the parking garage at which the vehicle is parked, to receive data pertaining to the level of the parking garage at which the vehicle is parked, and to transmit data indicating the level of the parking garage at which the vehicle is parked, and a telematics unit configured to collect data from one or more vehicle sensors and to transmit the data collected from the vehicle sensors to the server at the telematics service provider.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
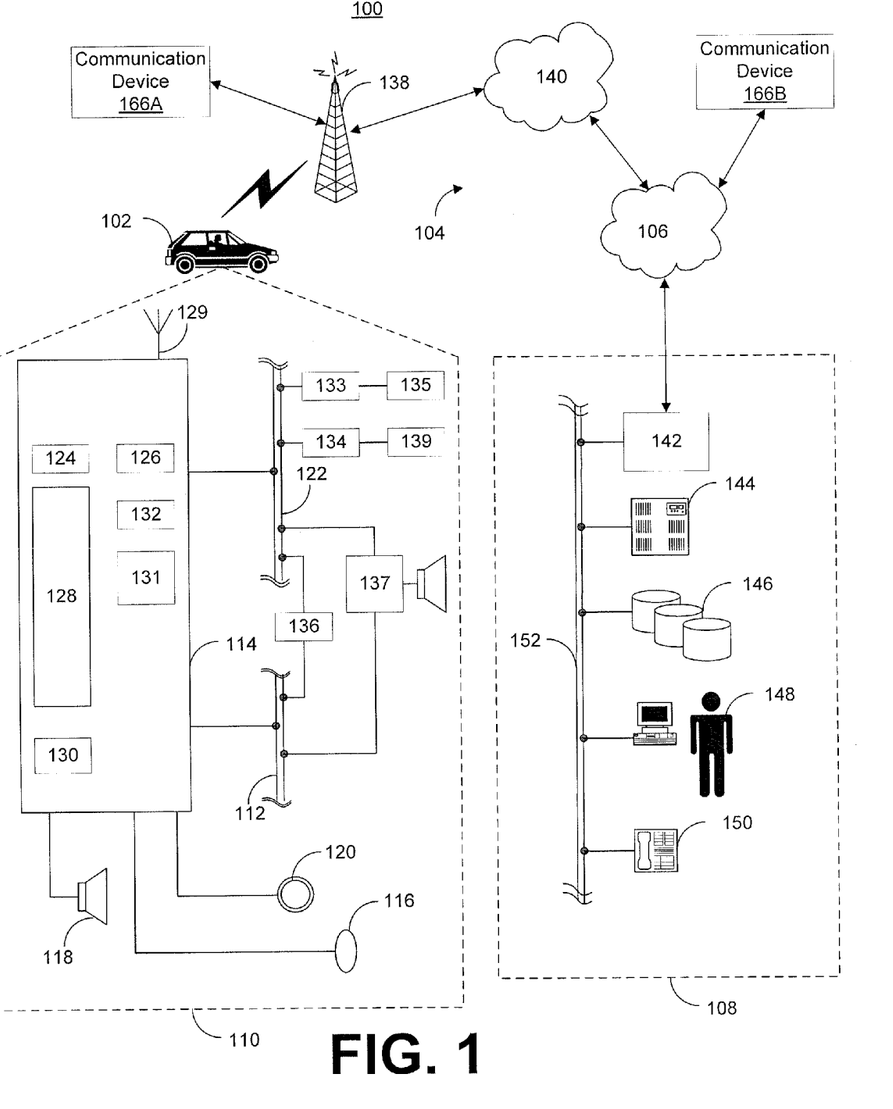
FIG. 1 is a schematic diagram of an operating environment for a mobile vehicle communication system, which includes a call center of a telematics service provider, usable in implementations of the described principles.

Before discussing the details of the invention, a brief overview of an example telematics system is given to guide the reader. FIG. 1 schematically depicts an example environment for carrying out the invention. It will be appreciated that the described environment is an example, and does not imply any limitation regarding the use of other environments to practice the invention. With reference to FIG. 1 there is shown an example of a communication system 100 that may be used with the present systems and methods and generally includes a vehicle 102, a wireless carrier system 104, a land network 106 and a call center 108 of a telematics service provider (TSP). It should be appreciated that the overall architecture, setup and operation, as well as the individual components of a system such as that shown in FIG. 1 are generally known in the art. Thus, the following paragraphs provide a brief overview of one such example information system 100. However, present systems and methods could be carried out in other environments as well.

Vehicle 102 is a mobile vehicle such as a motorcycle, car, truck, recreational vehicle (RV), boat, plane, etc., and is equipped with suitable hardware and software that enables it to communicate over system 100. The vehicle 102 is, in particular, driven by an electric motor that periodically requires recharging. Additionally, vehicle hardware 110 shown generally in FIG. 1 includes: a telematics unit 114, a microphone 116, a speaker 118, and buttons and/or controls 120 connected to the telematics unit 114. A network connection or vehicle bus 122 is operatively coupled to the telematics unit 114. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name but a few.

The telematics unit 114 is an onboard, device providing a variety of services through its communication with the call center 108, and generally includes an electronic processing device 128, one or more types of electronic memory 130, a cellular chipset/component 124, a wireless modem 126, a dual antenna 129 and a navigation unit containing a GPS chipset/component 132. The GPS chipset/component is capable of determining the location of the vehicle with a high degree of accuracy. For example, the GPS chipset/component could determine that an electric vehicle is located at a particular electric vehicle charging station. In one example, the wireless modem 126 comprises, and is carried out in the form of, a computer program and/or set of software routines executing within the electronic processing device 128. The cellular chipset/component 124 and the wireless modem 126 may be called the network access device (NAD) of the telematics unit 114. The NAD 114 further includes a short-range wireless unit 131 capable of communicating with a user's mobile device such as a cellular phone, tablet computer, PDA, or the like, over a short-range wireless protocol. For example, in one implementation, the short-range wireless unit 131 is a Bluetooth unit with an RF transceiver that communicates with a user's mobile device using Bluetooth protocol.

The telematics unit 114 provides a variety of services for subscribers. Examples of such services include: turn-by-turn directions and other navigation-related services provided in conjunction with the GPS based chipset/component 132; airbag deployment notification and other emergency or roadside assistance-related services provided in connection with various crash and or collision sensor interface modules 133 and sensors 135 located throughout the vehicle.

GPS navigation services are implemented based on the geographic position information of the vehicle provided by the GPS based chipset/component 132. A user of the telematics unit enters a destination using inputs corresponding to the GPS component, and a route to a destination is calculated based on the destination address and a current position of the vehicle determined at approximately the time of route calculation. Turn-by-turn (TBT) directions may further be provided on a display screen corresponding to the GPS component and/or through vocal directions provided through a vehicle audio component 137. It will be appreciated that the calculation-related processing may occur at the telematics unit or may occur at a call center 108. Furthermore, the telematics unit 114 may be configured to determine, based upon information provided by the GPS based chipset/component 132, that the vehicle 102 is entering or is about to enter a multi-level parking structure. In some implementations, the GPS based chipset component 132 itself is configured to determine that the vehicle 102 is about to enter a multi-level parking garage. For example, the OPS based chipset/component 132 may execute software that includes the locations of all known multi-level parking garages and that issues a notification when the vehicle travels into one of the known multi-level parking garages.

Infotainment-related services are provided by the TSP wherein music, Web pages, movies, television programs, video games and/or other content is downloaded to an infotainment center 136 operatively connected to the telematics unit 114 via a vehicle bus 122 and an audio bus 112. In one example, downloaded content is stored for current or later playback.

The preceding list of functions is by no means an exhaustive list of all of the capabilities of telematics unit 114, as should be appreciated by those skilled in the art, but is simply an illustration of some of the services that the telematics unit 114 offers. The telematics unit 114 may include a number of components known by those skilled in the art in addition to those described above.

Vehicle communications use radio transmissions to establish a communications channel within the wireless carrier system 104 so that voice and/or data transmissions occur over the communications channel. Vehicle communications are enabled via the cellular chipset/component 124 for voice communications and a wireless modem 126 for data transmission. For example, data pertaining to a forecast of a utility's renewable energy mixture can be transmitted to the telematics unit 114 via the wireless modern 126.

To enable successful data transmission over the communications channel, wireless modem 126 applies some form of encoding or modulation to convert the digital data so that it can communicate through a vocoder or speech codec incorporated in the cellular chipset/component 124. Any suitable encoding or modulation technique that provides an acceptable data rate and bit error can be used with the present method. The dual mode antenna 129 services the GPS chipset/component and the cellular chipset/component.

The microphone 116 provides the driver or other vehicle occupant with a means for inputting verbal or other auditory commands, and can be equipped with an embedded voice processing unit utilizing a human/machine interface (HMI) technology known in the art. Conversely, the speaker 118 provides verbal output to the vehicle occupants and can be either a stand-alone speaker specifically dedicated for use with the telematics unit 114 or can be part of the vehicle audio component 137. In either event, the microphone 116 and the speaker 118 enable vehicle hardware 110 and the call center 108 to communicate with the occupants through audible speech.

The vehicle hardware also includes the one or more buttons or controls 120 configured to enable a vehicle occupant to activate or engage one or more of the vehicle hardware components 110. For example, one of the buttons 120 is an electronic push button that, when pressed, initiates voice communication with the call center 108 (whether it be a live advisor 148 or an automated call response system). In another example, one of the buttons 120, when pushed, initiates emergency services.

The audio component 137 is operatively connected to the vehicle bus 122 and the audio bus 112. The audio component 137 receives analog information, rendering it as sound, via the audio bus 112. Digital information is received via the vehicle bus 122. The audio component 137 provides AM and FM radio, CD, DVD, and multimedia functionality independent of the infotainment center 136. The audio component 137 contains a speaker system, or alternatively utilizes the speaker 118 via arbitration on the vehicle bus 122 and/or the audio bus 112.

The vehicle crash and/or collision detection sensor interface 133 is operatively connected to the vehicle bus 122. The crash sensors 135 provide information to the telematics unit 114 via the crash and/or collision detection sensor interface 133 regarding the severity of a vehicle collision, such as the angle of impact and the amount of force sustained.

Vehicle sensors 139, connected to various sensor interface modules 134 are operatively connected to the vehicle bus 122. Vehicle sensors 139 include sensors with capabilities that include but that are not limited to determining a battery's state of charge (e.g. as a percentage of the total charge capacity), the charging status of a battery (i.e. whether the battery is currently being charged), and the current rate at which the battery is being charged (e.g. as a rate of change of the percentage of capacity charged per unit time). The vehicle sensors 139 can also include but are not limited to gyroscopes, accelerometers, magnetometers, emission detection and/or control sensors, and the like. The sensor interface modules 134 can include power train control, climate control, and body control, to name but a few.

The wireless carrier system 104 can be a cellular telephone system or any other suitable wireless system that transmits signals between the vehicle hardware 110 and the land network 106. According to an example, the wireless carrier system 104 includes one or more cell towers 138, base stations and/or mobile switching centers (MSCs) 140, as well as any other networking components required to connect the wireless system 104 with the land network 106. The mobile switching center may include a remote data server.

As appreciated by those skilled in the art, various cell tower/base station/MSC arrangements are possible and could be used with the wireless system 104 (also referred to as the "cellular network" herein). For example, a base station and a cell tower could be co-located at the same site or they could be remotely located, a single base station could be coupled to various cell towers, and various base stations could be coupled with a single MSC, to name but a few of the possible arrangements. Preferably, a speech codec or vocoder is incorporated in one or more of the base stations, but depending on the particular architecture of the wireless network, it could be incorporated within a Mobile Switching Center or some other network component as well.

The land network 106 is, for example, a conventional land-based telecommunications network connected to one or more landline telephones and connecting wireless carrier network 104 to call center 108. For example, the land network 106 includes a public switched telephone network (PSTN) and/or an Internet protocol (IP) network, as is appreciated by those skilled in the art. Of course, one or more segments of the land network 106 are implemented in the form of a standard wired network, a fiber or other optical network, a cable network, other wireless networks such as wireless local networks (WLANs) or networks providing broadband wireless access (BWA), or any combination thereof.

The call Center (OCC) 108 of the telematics service provider is designed to provide the vehicle hardware 110 with a number of different system back-end functions and, according to the example shown here, generally includes one or more switches 142, servers 144, databases 146, live advisors 148, and a variety of other telecommunication and computer equipment 150 that is known to those skilled in the art. These various call center components are coupled to one another, for example, via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of telecommunication and computer equipment 150 for demodulation and further signal processing.

The telecommunication and computer equipment 150 includes a modem that preferably includes an encoder, as previously explained, and can be connected to various devices such as application servers 144 and databases 146. For example, the databases 146 could be designed to store subscriber profile records or any other pertinent subscriber information. Although the illustrated example has been described as it would be used in conjunction with a manned call center, it will be appreciated that the call center 108 can be any central or remote facility, manned or unmanned, mobile or fixed, to or from which it is desirable to exchange voice and data.

A portion of the databases 146 stores information pertaining to the identity of the telematics unit 114. For example, the databases 146 may store, for each vehicle enrolled in a program, an integrated circuit card identifier (ICCID) corresponding to the subscriber identity modules (SIMs) of the vehicle's telematics unit, an international mobile equipment identity (IMEI) corresponding to network access devices (NADs) integrated into the vehicle's telematics units, a mobile identification number (MIN), an electronic serial numbers (ESN), a mobile equipment identifier (MEID), an international mobile subscriber identity (IMSI) associated with the SIM cards of the vehicle's telematics unit, a mobile device number (MDN), a mobile station international subscriber directory number (MSISDN), a service set identifier (SSID), a media access control (MAC) address, and an interact protocol (IP) address associated with the vehicle's telematics unit. Additional information pertaining to a subscriber affiliated with a particular telematics unit 114 may also be stored in the databases 146. For example, billing information associated with the subscriber may be stored in the databases 146. The preceding examples of information that can be stored at databases 146 is not exhaustive, and additional fields of data may also be stored at databases 146.

The servers 144 interface with databases 146 and telematics units such as the telematics unit 114. The servers 144 have processors that can be configured to request and receive information from telematics units such as the telematics unit 114. In some implementations, information requested and received by the servers 144 is subsequently stored in the databases 146. Furthermore, the servers 144 may communicate with the utility companies that supply electricity (not shown) through a land network, such as land network 106, through a wireless carrier system, such as e.g., wireless carrier system 104, or through a combination of a land network and a wireless carrier system. The servers 144 may request information from the electrical utilities, receive information from the electrical utilities, and store information received from the electrical utilities. In some implementations, the information received from the electrical utilities is stored at databases 146.

Communication devices 166A and 166B are capable of being communicatively connected to the call center 108 and vehicle hardware 110. Communication device 166A is connected to the call center 108 and the vehicle hardware 110 through wireless carrier system 104, while communication device 166B is connected to the call center 108 and the vehicle hardware 110 through land network 106. The communication devices 166A and 166E may be any of a smart phone, a tablet computer, a personal digital assistant (PDA), a laptop computer, a desktop computer, or any other device capable of sending and receiving transmissions via a voice or data network.

In general terms, not intended to limit the claims, the example environment depicted by FIG. 1 may be used by systems and methods that utilize the communicative connections between the TSP (through the call center 108), a communication device 166, and the telematics unit 114 in a vehicle parked in a multilevel parking garage, e.g. the vehicle 102, to determine location information of the vehicle 102 and to provide such information to a subscriber of the TSP. A subscriber of the TSP may transmit a request for information pertaining to the location of the vehicle 102 parked within a multilevel parking structure from one of the communication devices 166. Upon receiving such a request, the TSP (through the call center 108) provides the information requested by the subscriber. In various implementations, providing such information by the call center 108 may involve querying the telematics unit 114 in the vehicle 102 or querying a database storing location information pertaining to one or more vehicles and may further involve performing calculations to derive the information requested by the communication device.

In some implementations, the information requested by the communication device 166 includes, but is not limited to a floor number, or level, of the parking garage on which the vehicle 102 is parked. In such implementations, the call center 108 may query information initially generated by the telematics unit 114 of the vehicle 102. Such information may or may not include the information requested by the communication device 166. In implementations where the queried information does not include the information requested by the device, the queried information may provide the necessary resources for the call center 108 to calculate or derive the information requested by the device. In various implementations, the information queried by the call center 108 may be stored locations that include but are not limited to the telematics unit 114 of the vehicle 102, a database located at the call center 108, and a database located remotely from the cab center 108. In particular, the information queried by the call center 108 may be stored at a storage buffer of the telematics unit 114 of the vehicle 102. Such a storage buffer may store information collected from one or more vehicle sensors during operation of the vehicle 102. Alternatively, the information queried by the call center 108 may be located within a subscriber account data structure or a telematics unit data structure stored at a database remote from the telematics unit 114 of the vehicle 102.

In various implementations, storage of the information generated by the telematics unit 114 pertaining to the location of the vehicle 102 and requested by the call center 108 may be triggered by various events. In some implementations, detection of the movement of a vehicle on/off or ignition switch to the off position may trigger the uploading of information stored at a memory module of the telematics unit 114 of the vehicle 102 to a database remotely located from the vehicle 102. In some implementations, the data uploading is only triggered if the vehicle 102 is also determined to be located at a multilevel parking structure when the vehicle ignition is switched off. In some implementations, determining that the vehicle 102 is located at a multi-level parking garage may involve a reverse-geocoding process that provides an address for the vehicle 102 based on information provided from a location determining element of the vehicle 102, e.g., a GPS component of the vehicle 102.

In some implementations, the systems and methods described in the present disclosure contemplate determining in real time whether or not the vehicle 102 is located at a multi-level parking structure and, upon determining that the vehicle 102 is entering or has entered a multi-level parking structure, performing a process to determine the vehicle 102's present location within the parking structure. In further implementations, the uploading of the data to the database is only triggered if a subscriber account setting dictates that such data may be uploaded to a server or if an upload command is detected. Such an upload command may be the result of human input at the telematics-equipped vehicle 102. For example, an upload data button may be provided to a user of the vehicle 102, which, if selected, causes data to be uploaded from the vehicle 102 to a database. In some implementations, the upload data button may rely on user account settings in determining which data to upload, while in other implementations the upload data button may provide a user with the option to manually select categories of data to upload to the database.

After the information queried by the call center 108 is received by the call center 108, the call center 108 may perform calculations to generate or derive the information requested by the mobile communications device. In various implementations, the calculations performed by the call center 108 may include but are not limited to determining a number of circles, or loops, traversed by the vehicle 102 while located in a multi-level parking structure. Determining the number of loops may comprise comparing data provided from vehicle sensors that may include but are not limited to steering wheel sensors, wheel sensors, accelerometers, and vehicle speed sensors. In some implementations, determining the number of loops traversed by the vehicle 102 may comprise identifying repetitions in data produced from one or more sensors. A repetition may be determined to be present only when repetitions are identified at corresponding locations in data provided from multiple vehicle sensors. In some implementations, the repetitions must be periodic in order to denote the traversal or a loop or circle by the vehicle 102. The call center 108 may determine a level of a multilevel parking structure on which the vehicle 102 is parked based on the number of loops traversed by the vehicle 102 upon entry into a multilevel parking structure. In some implementations, the call center 108 may add or subtract an integer from the number of loops traversed by the vehicle 102 to determine the level on which the vehicle 102 is parked in order to account for idiosyncrasies of the multilevel parking garage. In such implementations, the call center 108 may query a database storing parking garage information in order to translate a number of loops traversed by the vehicle 102 to a parking garage level or floor. The call center 108 may also identify the directionality of the loops traversed. In determining the total number of loops traversed, the call center 108 may decrease the total number of loops traversed by subtracting the number of loops traversed in one direction from the number of loops traversed in an opposite direction.

In some implementations, the telematics unit 114 of the vehicle 102 may calculate the number of loops traversed by the vehicle 102 in real time. In such implementations, the telematics unit 114 may receive a notification from the call center 108 that the vehicle 102 is entering a multi-level parking garage. The notification that the vehicle 102 is entering a multi-level parking garage may further include instructions to the telematics unit 114 to begin a monitoring process that indicates the number of loops traversed by the vehicle 102. In some implementations, the vehicle 102 may display a number of loops traversed by the vehicle 102 to a user, or driver, of the vehicle 102 as well as a corresponding parking garage floor. In some implementations, the information displayed to the user may be accompanied with a request to the user to confirm the level of the parking garage on which the vehicle 102 is currently located. In the event that the call center 108 receives an indication that the parking garage level identified to the user is incorrect, the call center 108 may transmit instructions to the telematics unit 114 of the vehicle 102 to present the user with alternative parking garage level identifiers and a request to confirm which of the alternative parking garage levels the vehicle 102 is located at. The telematics unit 114 may also identify the directionality of the loops traversed. In determining the total number of loops traversed, the telematics unit 114 may decrease the total number of loops traversed by subtracting the number of loops traversed in one direction from the number of loops traversed in an opposite direction. In some implementations, a confirmation that the vehicle 102 is located at a particular level of a parking garage triggers the transmission of information to a subscriber account with which the telematics unit 114 of the vehicle 102 is associated. Such a confirmation may also trigger the transmission of a message indicating the level of the parking structure to the communication device 166A or 166B associated with the telematics unit 114 or a subscriber account.

Figure 2:
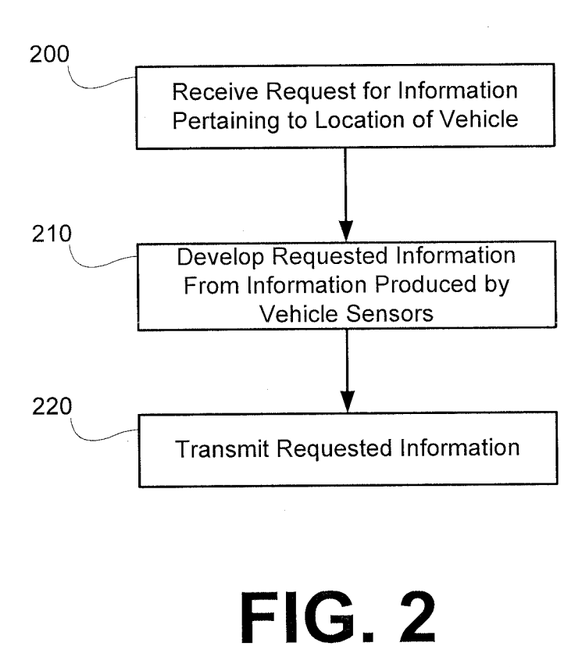
FIG. 2 is a flow chart summarizing an example process executed by a telematics unit of a vehicle for providing information pertaining to a location of the vehicle within a multi-level parking structure.

FIG. 2 is a flow chart summarizing an example process executed by the telematics unit 114 of the vehicle 102 for providing information indicative of a present location of the vehicle 102 within a multilevel parking structure. At step 200 the telematics unit 114 receives a request for information pertaining to the location of the vehicle 102 within a multilevel parking structure. In some implementations, the request received from the telematics unit 114 may originate from the communication device 166, such as a smart phone or tablet computer, or from another device connected to the Internet, such as a desktop computer. In alternative implementations, the request received by the call center 108. In various implementations, the information pertaining to the location of the vehicle 102 requested in the request received by the telematics unit 114 at step 200 may include but is not limited to information collected from vehicle sensors and stored in a data store of the telematics unit 114 and the location of information uploaded by the telematics unit 114 to a database. The vehicle sensors collecting information may include but are not limited to a steering wheel position sensor, a wheel position sensor, an accelerometer, a compass, and a speed sensor.

At step 210, the telematics unit 114 of the vehicle 102 produces the information requested in the request received by the telematics unit 114 at step 200. Depending on the specific implementation, the telematics unit 114 may produce data located at a data store at the telematics unit 114, or produce a location of a server, a database, or an alternative location from which the requested data can be obtained or from which the requested data can be computed. At step 220, the telematics unit 114 transmits the information requested in the request received at step 200, or the telematics unit 114 transmits a location from which the data requested in the request received at step 200 may be obtained.

Figure 3:
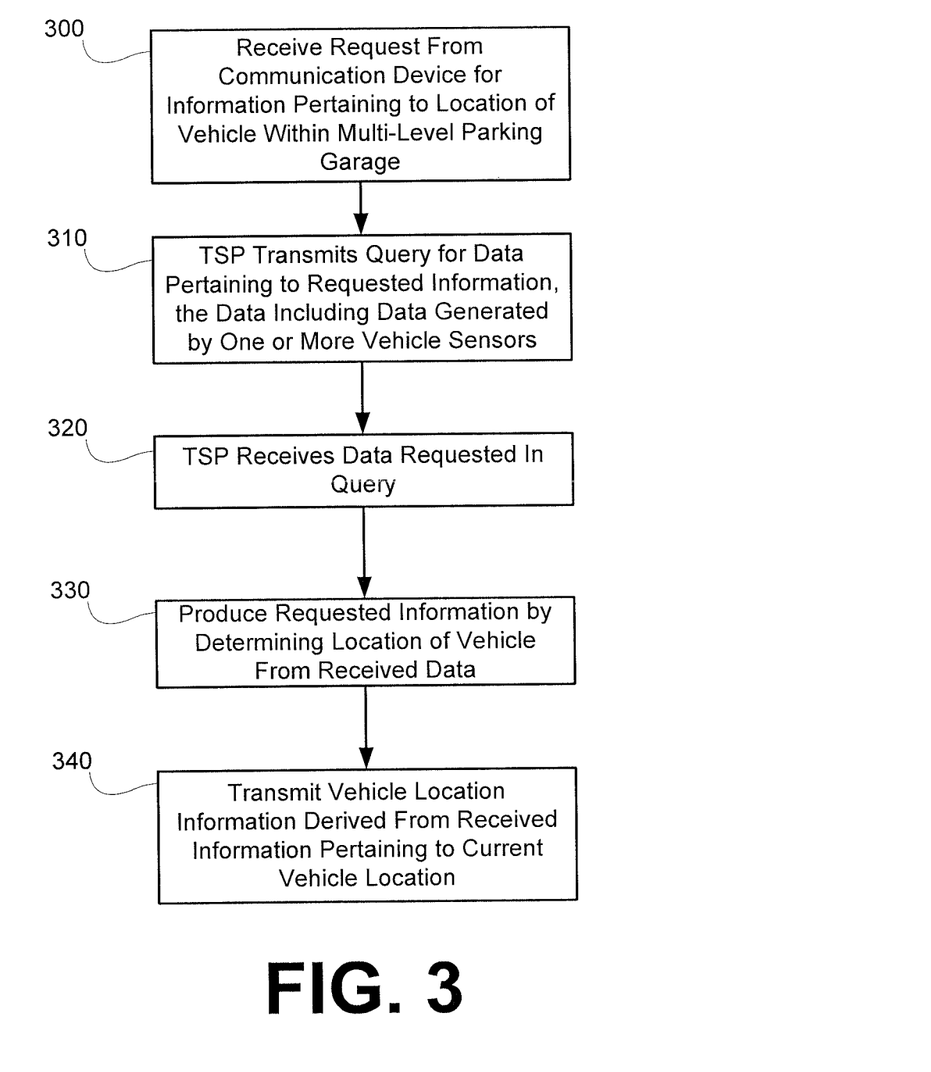
FIG. 3 is a flow chart summarizing an example process executed by a telematics service provider for determining a location of a telematics-equipped vehicle within a multilevel parking structure.

FIG. 3 is a flow chart summarizing an example process executed by the call center 108 for providing a location of the vehicle 102. At step 300, the call center 108 receives a request for information pertaining to the location of the vehicle 102 within a multilevel parking structure. Depending on the implementation, the request received by the call center 108 at step 300 may be sent from a mobile communications device, such as one of the communication devices 166A and 166B, or other device communicative connected to the call center 108 through the network 106, or the request may be sent from the telematics unit 114 itself. In some implementations, the request may inquire into the level of a multilevel parking structure at which the vehicle 102 is located.

At step 310, the call center 108 transmits a query for data pertaining to the location of the vehicle 102 within the parking structure. In various implementations, the query sent by the call center 108 at step 310 may be sent to different locations. In some implementations, queries may be sent to multiple locations, or may be sent to a sequence of locations. For example, the call center 108 may first request the data from the telematics unit 114 of the vehicle 102, and upon determining that the data was not provided by the telematics unit 114 of the vehicle 102, the call center 108 may then send a request to a database storing subscriber account data structures. The request sent by the call center 108 at step 310 may also be sent to a variety of other data storage locations communicatively connected to the call center 108. In some locations, an initial query sent by the call center 108 at step 310 will be met with a response including the location of another data storage location that may contain data requested by the call center 108. Thereafter the call center 108 may send an additional query, also part of step 310, to the data storage location identified in the response to the prior query. For example, the call center 108 may initially send a query to the vehicle 102 for data pertaining to the location of the vehicle 102 within a parking structure, the vehicle 102 may respond with the location of a database, and the call center 108 may thereafter query the database identified by the vehicle 102.

At step 320, the call center 108 receives the data requested in the query. Depending on the implementation, the data received by the call center 108 at step 320 may include data indicating the location of the vehicle 102 within a parking structure or may merely include data from which the call center 108 is able to determine or calculate the location of the vehicle 102. For example, the data received by the call center 108 at step 320 may include but is not limited to a number of circles, or loops, traversed by the vehicle 102 within a multilevel parking garage, a level or floor of the parking garage on which the vehicle 102 last parked, and data acquired by one or more vehicle sensors. Such vehicle sensors may include but are not limited to a steering wheel position sensor, a wheel position sensor, an accelerometer, a compass, and a speed sensor. In some implementations, a number of levels of ascent or descent recorded prior to the ignition being turned off may be combined with a number of levels of ascent or descent recorded prior to a preceding ignition turn off event. For example, if a manual vehicle stalls as a result of operator error, the number of levels of ascent and descent occurring immediately prior to multiple ignition shut off events may be aggregated. Similarly, data recorded by vehicle sensors immediately prior to an ignition turn off event may be combined with data recorded prior to a preceding vehicle turn off event in order to determine the total number of levels of net ascent or descent within a multilevel parking garage.

At step 330 the call center 108 produces the data requested from the call center 108 at step 300. In some implementations, producing the information requested from the call center 108 at step 330 may include calculating a level of a multilevel parking garage at which the vehicle 102 is located. For example, the call center 108 may perform calculations that include but are not limited to determining a number of circles, or loops, traversed by the vehicle 102 while located in a multi-level parking structure. Determining the number of loops may comprise comparing data provided from vehicle sensors that may include but are not limited to steering wheel sensors, wheel sensors, accelerometers, and vehicle speed sensors and also accounting for data provided by a GPS component in the vehicle 102. In some implementations, determining the number of loops traversed by the vehicle 102 may comprise identifying repetitions in data produced from one or more sensors. A repetition may be determined to be present only when repetitions are identified at corresponding locations in data provided from multiple vehicle sensors. In some implementations, the repetitions must be periodic in order to denote the traversal or a loop or circle by the vehicle 102. The call center 108 may determine a level of a multilevel parking structure on which the vehicle 102 is parked based on the number of loops traversed by the vehicle 102. In some implementations, the call center 108 may add or subtract an integer from the number of loops traversed by the vehicle 102 in order to determine the level on which the vehicle 102 is parked in order to account for idiosyncrasies of the multilevel parking garage. In such implementations, the call center 108 may query a database storing parking garage information in order to translate a number of loops traversed by the vehicle 102 to a parking garage level or floor. The call center 108 may also identify the directionality of the loops traversed. In determining the total number of loops traversed, the call center 108 may decrease the total number of loops traversed by subtracting the number of loops traversed in one direction from the number of loops traversed in an opposite direction.

At step 340, the telematics unit 114 transmits the information identified at step 330 to the entity that transmitted the request received at step 330, e.g. the communication device 166.

Figure 4:
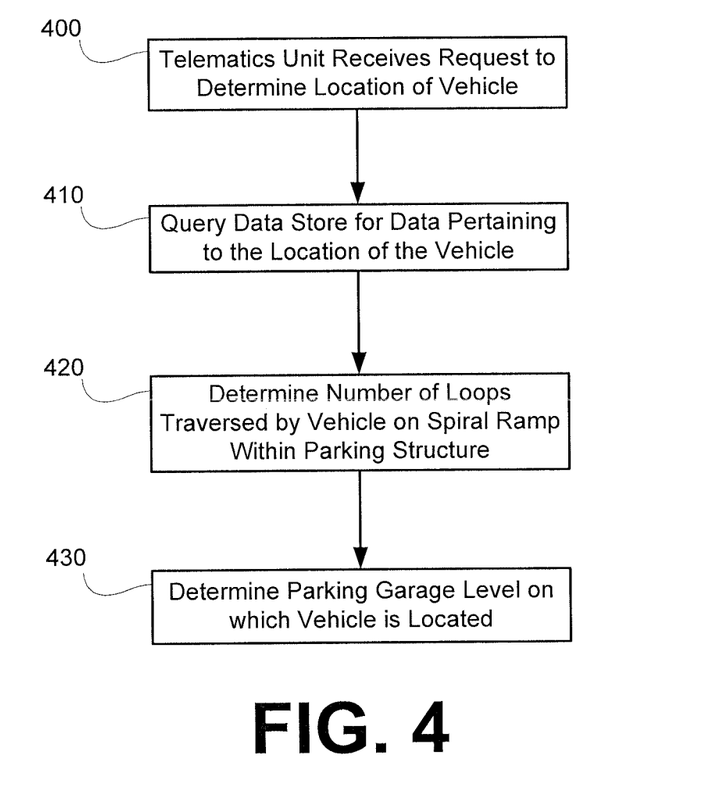
FIG. 4 is a flow chart summarizing an example process executed by a telematics unit of a vehicle for determining a location of the vehicle within a multilevel parking structure.

FIG. 4 is a flow chart summarizing an example process executed by the telematics unit 114 of the vehicle 102 for providing information indicating a present location of the vehicle 102 within a multilevel parking structure. At step 400, the telematics unit 114 receives a request to determine the location of the vehicle 102 within a multilevel parking structure. In some implementations, the request may indicate that the telematics unit 114 is to determine a current location of the vehicle 102 within the multilevel parking structure. In alternative implementations, the request ma indicate that the telematics unit 114 should determine a location of the vehicle 102 within the multilevel parking structure at a future point in time. The future point of time may be the time at which a particular event occurs, for example the time at which a vehicle ignition switch is turned off or the time at which a power off signal is received from a vehicle component. In general, the future point in time may be the time at Which any event indicating that the vehicle 102 has parked. For example, a prolonged period of a vehicle speed sensor determining that the speed of the vehicle 102 is zero may be used to demarcate the future point in time. In some implementations, receiving the request at step 400 may cause the telematics unit 114 to begin recording data from one or more vehicle sensors, or may cause the telematics unit 114 to store the point in time at which the request was received as a reference point for future calculations. In some implementations, the receipt of the request at step 400 may prime the telematics unit 114 to record the occurrence of a future event. For example, the receipt of the request at step 400 may prime the telematics unit 114 to record the occurrence of an event indicating that the vehicle 102 has entered a multilevel parking structure.

At step 410, the telematics unit 114 queries a data store for data pertaining to the location of the vehicle 102 within the multilevel parking structure. In some implementations, the elements queried by the telematics unit 114 at step 410 may be limited to a data store locally located at the vehicle 102. In alternative implementations, the elements queried by the telematics unit 114 at step 410 may further include a remotely located data store. For example, the telematics unit 114 may transmit a query to a remote database requesting that the database provide the telematics unit 114 with a data structure that maps a number of levels ascended or descended by the vehicle 102 with a level or floor number of the multilevel parking garage. Information requested by the telematics unit 114 in the query at step 410 may include information collected by one or more vehicle sensors. Such vehicle sensors may include but are not limited to a steering wheel position sensor, a wheel position sensor, an accelerometer, a compass, a GPS chipset component, and a speed sensor.

At step 420, the telematics unit 114 determines the number of loops traversed by the vehicle 102 while the vehicle 102 was within the multilevel parking garage. Determining the number of loops may comprise comparing data provided from vehicle sensors that may include but are not limited to steering wheel sensors, wheel sensors, accelerometers, and vehicle speed sensors and also accounting for data provided by a GPS component in the vehicle 102. In some implementations, determining the number of loops traversed by the vehicle 102 may comprise identifying repetitions in data produced from one or more sensors. A repetition may be determined to be present only when repetitions are identified at corresponding locations in data provided from multiple vehicle sensors. In some implementations, the repetitions must be periodic in order to denote the traversal or a loop or circle by the vehicle 102.

At step 430, the telematics unit 114 determines the level of the parking garage at which the vehicle 102 is located. The telematics unit 114 may determine a level of a multilevel parking structure on which the vehicle 102 is parked based on the number of loops traversed by the vehicle 102. In some implementations, the telematics unit 114 may add or subtract an integer from the number of loops traversed by the vehicle 102 in order to determine the level on which the vehicle 102 is parked in order to account for idiosyncrasies of the multilevel parking garage. In such implementations, the telematics unit 114 may query a database storing parking garage information in order to translate a number of loops traversed by the vehicle 102 to a parking garage level or floor. The telematics unit 114 may also identify the directionality of the loops traversed. In determining the total number of loops traversed, the telematics unit 114 may decrease the total number of loops traversed by subtracting the number of loops traversed in one direction from the number of loops traversed in an opposite direction.

Figure 5:
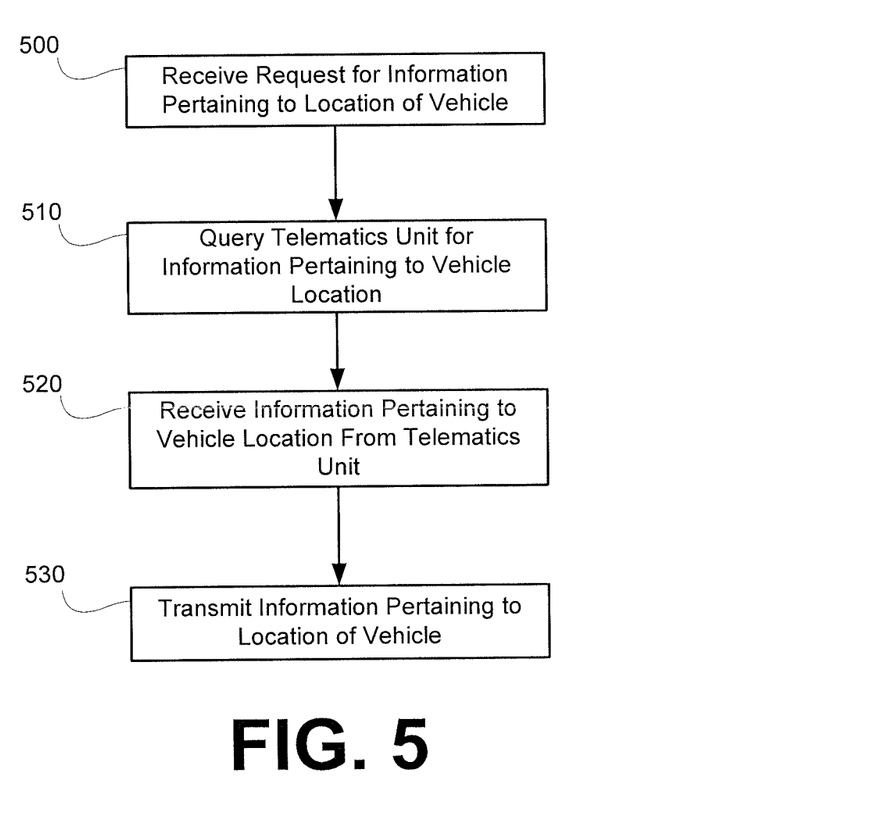
FIG. 5 is a flow chart summarizing an alternative example process executed by a telematics service provider for determining a location of a telematics-equipped vehicle within a multi-level parking structure.

FIG. 5 is a flow chart summarizing an alternative example process executed by the call center 108 for identifying a location of the vehicle 102 within a multi-level parking structure. At step 500, the call center 108 receives a request to determine a location of the vehicle 102. In various implementations, the request received at step 500 may originate from the telematics unit 114 of the vehicle 102, from a mobile device, such as a smart phone or a tablet computer, or from a variety of other devices, such as a desktop computer. In some implementations, the request may pertain to a current location of the vehicle 102, while in other implementations the request may pertain to the location of the vehicle 102 at a point in time in the future or at a prior point in time. For example, the request may pertain to the most recent point in time at which an event indicating that the vehicle 102 became parked occurred or at the next point in time at which an event indicating that the vehicle 102 becomes parked will occur. Events indicating that the vehicle 102 is parked may include but are not limited to the vehicle ignition switch being moved from an on position to an off position, the receipt of a power off signal from a vehicle component, and a prolonged period of time during which a vehicle speed sensor registers a reading of zero or approximately zero.

At step 510, the call center 108 queries one or more data stores for data pertaining to the location of the vehicle 102. In some implementations, the data may be indicative of a location of the vehicle 102 within a multilevel parking structure. In some implementations, the one or more data stores queried by the call center 108 at step 510 may be limited to data stores located at the vehicle 102. In alternative implementations, the elements queried by the call center 108 at step 510 may further include a data stores located remotely from the vehicle 102. For example, the call center 108 may transmit a query to a database maintained at call center 108 or to a remote database requesting that the database provide the call center 108 with a data structure that maps a number of levels ascended or descended by the vehicle 102 with a level or floor number of the multilevel parking garage. Information requested by the call center 108 in the query at step 510 may include information collected by one or more vehicle sensors. Such vehicle sensors may include but are not limited to a steering wheel position sensor, a wheel position sensor, an accelerometer, a compass, a GPS chipset component, and a speed sensor.

At step 520, the telematics unit 114 receives data pertaining to the location of the vehicle 102. In some implementations, the data pertains to the number of loops traversed by the vehicle 102 while the vehicle 102 was within a multilevel parking garage. For example, the data may consist of an integer number of loops that the vehicle 102 has traversed within a parking garage as determined by the telematics unit 114 of the vehicle 102. In other implementations, the data may include data that is acquired from one or more sensors located at the vehicle 102. In such implementations, the call center 108 may determine, also at step 520, the number of loops traversed by the vehicle 102 from the data provided by the one or more sensors located at the vehicle 102. Determining the number of loops traversed by the vehicle 102 may comprise identifying repetitions in data produced from one or more sensors. A repetition may be determined to be present only when repetitions are identified at corresponding locations in data provided from multiple vehicle sensors. In some implementations, the repetitions must be periodic in order to denote the traversal or a loop or circle by the vehicle 102. The call center 108 may determine a level of a multilevel parking structure on which the vehicle 102 is parked based on the number of loops traversed by the vehicle 102. In some implementations, the call center 108 may add or subtract an integer from the number of loops traversed by the vehicle 102 in order to determine the level on which the vehicle 102 is parked in order to account for idiosyncrasies of the multilevel parking garage. In such implementations, the call center 108 may query a database storing parking garage information in order to translate a number of loops traversed by the vehicle 102 to a parking garage level or floor. The call center 108 may also identify the directionality of the loops traversed. In determining the total number of loops traversed, the call center 108 may decrease the total number of loops traversed by subtracting the number of loops traversed in one direction from the number of loops traversed in an opposite direction. At step 530, the call center 108 transmits the information pertaining to the location of the vehicle 102. In some implementations, the transmission sent at step 530 is sent to the same device that transmitted the request to the call center 108 at step 500. In other implementations, the transmission sent at step 530 is sent to a different device than the device that transmitted the request at step 500. In various implementations, the transmission sent at step 530 may be sent to the telematics unit 114 of the vehicle 102, such as the telematics unit 114, to a mobile device, such as a smart phone or a tablet computer, or to a variety of other devices, such as a desktop computer, capable of receiving a communicative transmission from the call center 108.

It will be appreciated by those of skill in the art that the execution of the various machine-implemented processes and steps described herein may occur via the computerized execution of computer-executable recommendations stored on a tangible computer-readable medium, e.g., RAM, ROM, PROM, volatile, nonvolatile, or other electronic memory mechanism. Thus, for example, the operations performed by the telematics unit 114 may be carried out according to stored recommendations or applications installed on the telematics unit 114, and operation performed at the call center may be carried out according to stored recommendations or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, implemented through the use of a telematics unit of a vehicle, for determining a present location of the vehicle within a multi-level parking structure, the method comprising:
   determining that the vehicle is operating within a multi-level parking garage;
   determining, at least in part by identifying repetitions in data generated by one or more vehicle sensors, a number of circles traversed by the vehicle on a spiraling vehicle ramp in the multi-level parking garage;
   determining, based at least partly upon the number of circles traversed, a first value identifying a level of the multi-level parking garage at which the vehicle is located; and
   storing data representative of the first value at a data store of the telematics unit.

2. The method of claim 1, further comprising:
   displaying the first value to a user of the vehicle;
   displaying, at a user interface of the vehicle, a prompt requesting that a user confirm that the vehicle is located at a level of the multi-level parking garage equivalent to the first value;
   storing the first value as the actual level of the parking garage if the user confirms that the vehicle is located at a level of the multi-level parking garage equivalent to the first value; and
   requesting that the user indicate a value for the actual level of the parking garage if the user indicates that the estimated level is not the actual level.

3. The method of claim 1, further comprising:
   storing the first value in a memory element at the vehicle; and
   transmitting the first value to a telematics service provider.

4. The method of claim 3, wherein the transmitting the first value to a telematics service provider is triggered by a transition of the vehicle to an off mode.

5. The method of claim 1, further comprising:
   determining the altitude at which the vehicle is parked;
   determining, based at least partly upon the altitude at which the vehicle is parked, a second value identifying a level of the multi-level parking garage at which the vehicle is located;
   comparing the first value with the second value; and
   storing, as the actual level of the parking garage at which the vehicle is located, the first value if the first value equals the second value.

6. The method of claim 1, wherein determining that the vehicle is entering a multi-level parking garage utilizes information provided by a GPS component of the vehicle.

7. The method of claim 1, wherein the one or more vehicle sensors comprise one of the group consisting of: a steering wheel position sensor, a wheel position sensor, an accelerometer, and a vehicle speed sensor.

8. The method of claim 1, wherein the determining a number of circles traversed by the vehicle in the multi-level parking garage comprises:
   determining a total number of circles traversed by the vehicle in the parking garage;
   determining that one or more of the circles traversed by the vehicle were traversed in the a first direction opposite to a direction in which the remaining circles were traversed by the vehicle; and
   determining that the number of circles traversed by the vehicle in the multi-level parking garage is equal to the absolute value of the number of circles traversed in the first direction subtracted from the total number of circles traversed by the vehicle.

9. A method, implemented using a mobile device, for determining the location of a vehicle in a multi-level parking garage, the method comprising:
   transmitting a request for information pertaining to the location of a vehicle from the mobile device to a telematics service provider; and
   receiving information identifying the level of the multi-level parking garage at which the vehicle is parked from the telematics service provider;
   wherein the level of the multi-level parking garage at which the vehicle is parked is determined from a number of circles traversed by the vehicle on a spiraling vehicle ramp in the multi-level parking garage,
   wherein the number of circles traversed by the vehicle on the spiraling vehicle ramp is determined by identifying repetitions in data provided by one or more vehicle sensors located at the vehicle.

10. The method of claim 9, wherein the one or more vehicle sensors comprise one of the group consisting of: a steering wheel position sensor, a wheel position sensor, an accelerometer, and a vehicle speed sensor.

11. The method of claim 9, wherein the level of the multi-level parking garage at which the vehicle is parked is determined from a first value identifying a level of the multi-level parking garage at which the vehicle is located.

12. The method of claim 11, wherein the level of the multi-level parking garage at which the vehicle is parked is further determined by ascertaining an altitude at which the vehicle is parked and determining, based at least partly upon the altitude at which the vehicle is parked, a second value identifying a level of the multi-level parking garage at which the vehicle is located.

13. The method of claim 12, wherein the level of the multi-level parking garage is confirmed through acquiring user feedback, wherein acquiring user feedback comprises:
   displaying the first and second values to a user of the vehicle;
   displaying, at a user interface of the vehicle, a prompt requesting that a user confirm that the vehicle is located at a particular location within the multi-level parking garage identified by one of the first or second values;
   storing the first value as the actual level of the parking garage if the user confirms that the vehicle is located at the level identified by the first value;
   storing the second value as the actual level of the parking garage if the user confirms that the vehicle is located at the level identified by the second value; and
   requesting that the user indicate the actual level of the parking garage if the user indicates that the estimated level is not the actual level.

14. The method of claim 11, wherein the ascertaining a number of circles traversed by the vehicle in the multi-level parking garage comprises:
   determining a total number of circles traversed by the vehicle in the parking garage;

determining that one or more of the circles traversed by the vehicle were traversed in the a first direction opposite to a direction in which the remaining circles were traversed by the vehicle; and determining that the number of circles traversed by the vehicle in the multi-level parking garage is equal to the absolute value of the number of circles traversed in the first direction subtracted from the total number of circles traversed by the vehicle.

15. The method of claim 9, wherein determining the level of the multi-level parking garage on which the vehicle is located is performed by the telematics unit.

16. The method of claim 9, wherein the mobile device is one of the group consisting of: a smart phone and a tablet computer.

17. A system for determining the location of a vehicle within a multi-level parking structure, the system comprising:

a mobile device configured to transmit a request for a location of the vehicle within the multi-level parking structure and to receive data indicating the level of the parking garage at which the vehicle is parked;

a telematics service provider having a server, the server configured to receive a request for a location of the vehicle within the multi-level parking structure, to submit a query for data pertaining to the level of the parking garage at which the vehicle is parked, to receive data pertaining to the level of the parking garage at which the vehicle is parked, and to transmit data indicating the level of the parking garage at which the vehicle is parked; and a telematics unit configured to collect data from one or more vehicle sensors and to transmit the data collected from the vehicle sensors to the server at the telematics service provider.

18. The system of claim 17, wherein the vehicle sensors comprise one of the group consisting of: a steering wheel position sensor, a wheel position sensor, an accelerometer, and a vehicle speed sensor.

* * * * *